Oct. 22, 1935.   L. E. AXTELL   2,018,003
ROOT WATERING TOOL
Filed June 6, 1934
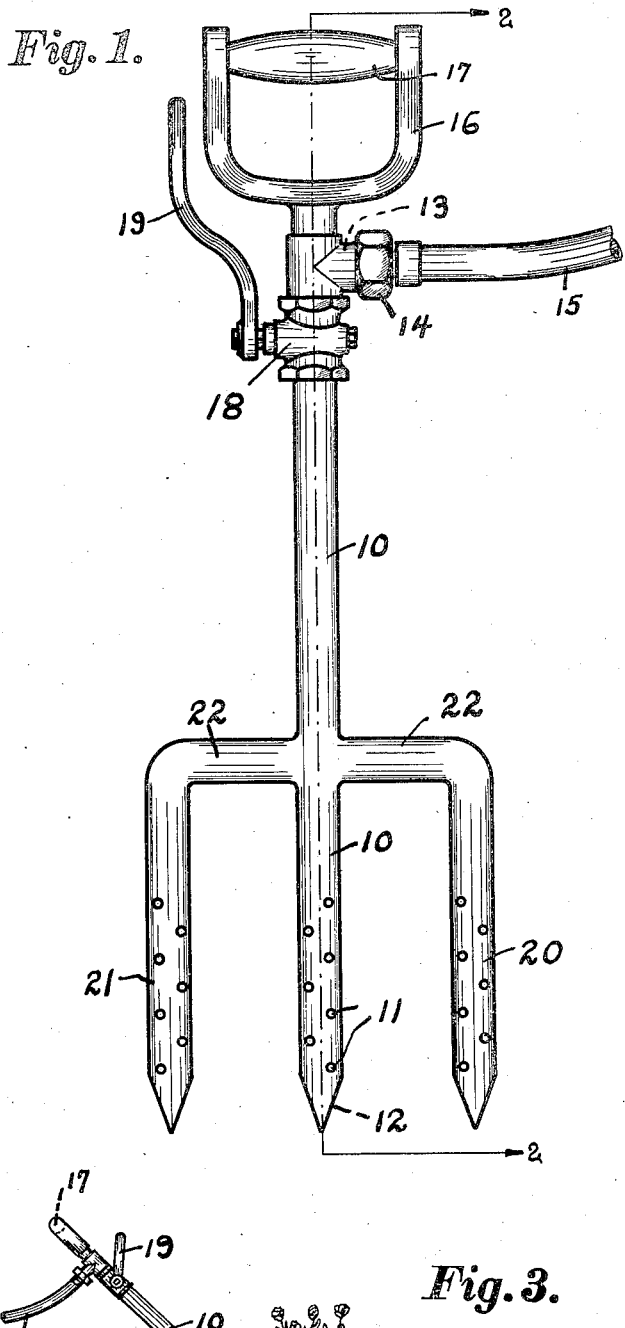
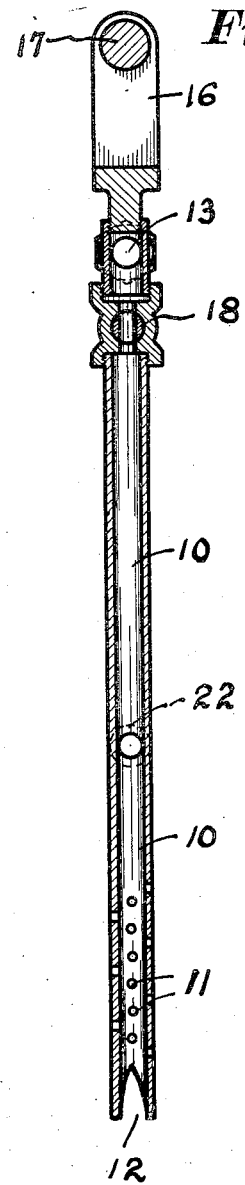
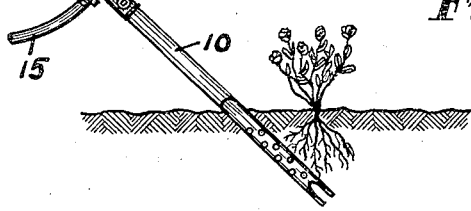
Fig. 1.
Fig. 2.
Fig. 3.
Inventor
L. E. Axtell
By Arthur H. Sturges
Attorney Patented Oct. 22, 1935

2,018,003

UNITED STATES PATENT OFFICE 2,018,003

ROOT WATERING TOOL

Leonard E. Axtell, Blair, Nebr.

Application June 6, 1934, Serial No. 729,225

4 Claims. (Cl. 47—49)

This invention relates to gardening appliances and more particularly to a tool for watering plants, shrubs, vines and the like.

An object of the invention is to provide means for applying water adjacent the roots of plants and the like, said means to be economical in manufacture, of few and simple parts and easy of operation.

Other and further objects and advantages of the invention will be understood from the following detailed description thereof.

In the drawing Figure 1 is a side elevation of the new tool and Figure 2 is a vertical section thereof taken on the dotted line 2—2 of Figure 1. Figure 3 illustrates the application of the tool to the roots of a shrub or the like.

In the drawing the numeral 10 indicates an elongated hollow tine provided with a plurality of apertures 11, adjacent its lower end and an outlet port 12.

The tine is provided with an inlet port 13 in communication with a hose connection 14 whereby a flexible hose or conduit 15 may be readily attached to the tool for communicating water under pressure to the intake port 13 and tine 10 for watering a shrub or the like at the roots thereof.

The upper end of the tine 10 preferably terminates in a bifuricated member 16 having a handle or cross piece 17.

Intermediate the inlet and outlet ports a water cut off valve 18 is provided for the tine 10 having an elongated operating-handle 19 which preferably extends upwardly and terminates adjacent to the handle 17 for facilitating the operation of the valve simultaneously with the tool.

The tool may be provided with a plurality of tines such as the tine 20 and 21, the lower portions thereof being similar to the lower portion of the tine 10 and provided with suitable apertures and outlet ports which are preferably identical in arrangement, shape and size with those of the tine 10. The tines 20 and 21 may be formed integral with the tine 10 by welding or the like and are suitably joined thereto at their right angular portions 22 whereby a foot rest is provided for purposes later described in addition to providing a communication between the tine 10 and the tines 20 and 21. Preferably the tines are pointed at their lower ends as best shown in Figure 1.

In arid regions or during a drouth and particularly when working in certain soils it is practically impossible to supply water at the roots of plants by solely placing water upon the soil above said roots in that the water evaporates in lieu of soaking through the soil to the depth of the roots where it is needed and whereby valuable plants and shrubs are frequently lost from lack of an adequate supply of moisture and obviously the present invention provides a means whereby moisture may be readily supplied where it is most needed.

In operation the hose 15 being connected to a source of water supply the tool is forced into the ground adjacent a shrub as shown in Figure 3. In instances where the soil is of hard characteristics such as clay or the like the pointed ends of the tool facilitate the operation, the pressure of the water removing earth or débris from the interior of the tine or tines, and in such heavy soils the tool may be forced therein by the application of the operator's foot upon one of the members 22 while the tool is guided or held at a desired degree of inclination from its handle 17; whereupon the cut off valve 18 may be operated for watering the roots of a shrub.

In loose or sandy soils no particular pressure upon the members 22 is required in that the pressure of the water will gouge apertures in the soil as the water exudes from the tines. The cut off valve also provides a means for conserving water during the transportation of the tool from one shrub to another as well as providing a means for regulating the amount and force of the water applied to a particular plant.

From the foregoing description it is thought to be obvious that a gardening appliance constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as claimed.

What I claim is:—

1. A plant watering tool comprising a plurality of intercommunicating tubular tines having pointed ends and a foot rest for facilitating forcing the tines into soil, said tines provided with outlet ports adjacent their pointed ends, an inlet port for the tines having a hose connection for a communication with a source of water supply, and a cut-off valve carried by the tool for regulating the amount of water communicated to the outlet ports.

2. A plant watering tool, comprising an elongated tubular tine having a pointed end and a lateral outlet port, and a hose connection for the tubular tine.

3. A plant watering tool, comprising an elongated tubular tine having a pointed end and a lateral outlet port, a hose connection for the tubular tine, and a controlling valve mounted on the tine to control the flow of fluid therethrough.

4. A root watering tool, comprising a hollow shank having a handle on its upper end and a plurality of tines on its lower end, said tines having pointed lower extremities and lateral outlet openings, a hose connection mounted on said shank near the handle, and a valve mounted on said shank for controlling passage of fluid therethrough and having an arm extending toward the handle for operation of the valve.

LEONARD E. AXTELL.